(12) United States Patent
Boucharel et al.

(10) Patent No.: US 11,780,422 B2
(45) Date of Patent: Oct. 10, 2023

(54) CONTROL COMPUTER FOR A DRIVE TRAIN OF A HYBRID VEHICLE

(71) Applicant: Vitesco Technologies GmbH, Regensburg (DE)

(72) Inventors: Paul Boucharel, Toulouse (FR); Johannes Hofstetter, Toulouse (FR)

(73) Assignee: Vitesco Technologies GmbH

( * ) Notice: Subject to any disclaimer, the term of this patent is extended or adjusted under 35 U.S.C. 154(b) by 0 days.

(21) Appl. No.: 17/628,371

(22) PCT Filed: Aug. 10, 2020

(86) PCT No.: PCT/EP2020/072335
§ 371 (c)(1),
(2) Date: Jan. 19, 2022

(87) PCT Pub. No.: WO2021/043533
PCT Pub. Date: Mar. 11, 2021

(65) Prior Publication Data
US 2022/0281434 A1  Sep. 8, 2022

(30) Foreign Application Priority Data
Sep. 5, 2019  (FR) ...................................... 1909784

(51) Int. Cl.
*B60W 20/16* (2016.01)
*B60W 20/11* (2016.01)
(Continued)

(52) U.S. Cl.
CPC ............ *B60W 20/16* (2016.01); *B60W 10/06* (2013.01); *B60W 10/08* (2013.01); *B60W 20/11* (2016.01);
(Continued)

(58) Field of Classification Search
CPC .. B60W 20/11; B60W 20/16; B60W 50/0097; F01N 3/2013; F01N 3/2026;
(Continued)

(56) References Cited

U.S. PATENT DOCUMENTS 5,441,122 A * 8/1995 Yoshida ................ B60W 10/06
180/65.245
5,785,138 A * 7/1998 Yoshida ................ B60W 10/08
180/65.245
(Continued)

FOREIGN PATENT DOCUMENTS

CN 107848524 A 3/2018
CN 110139789 A 8/2019
(Continued)

OTHER PUBLICATIONS

Lescot, Julien et al., "On the integration of optimal energy management and thermal management of hybrid electric vehicles", 2010 IEEE Vehicle Power and Propulsion Conference, Date of Conference: Sep. 1-3, 2010, 6 pages (Year: 2010).*
(Continued)

*Primary Examiner* — David A Testardi
(74) *Attorney, Agent, or Firm* — RatnerPrestia

(57) ABSTRACT

A computer for controlling a drivetrain of a hybrid vehicle including a combustion engine, an electric machine, a battery and a "heated" catalytic converter including an internal heating system. The computer being configured to determine a plurality of values for a criterion pertaining to the energy consumption of the drivetrain as a function of the distribution of torque between the at least one combustion engine and the at least one electric machine, of the at least one combustion mode of the combustion engine, and of the energy consumption due to the use of the catalytic converter, select the minimum value of the consumption criterion, apply the combustion engine torque command, the electric
(Continued)

machine torque command, the command pertaining to the energy consumption by the catalytic converter and the command pertaining to the combustion mode of the combustion engine corresponding to the selected value of the consumption criterion.

10 Claims, 2 Drawing Sheets

(51) Int. Cl.
*B60W 10/06* (2006.01)
*B60W 10/08* (2006.01)
*F02D 41/02* (2006.01)
*F01N 3/20* (2006.01)

(52) U.S. Cl.
CPC ......... *F01N 3/2026* (2013.01); *F02D 41/024* (2013.01); *B60W 2510/06* (2013.01); *B60W 2510/08* (2013.01); *B60W 2510/305* (2013.01); *B60W 2520/40* (2013.01); *B60W 2530/12* (2013.01); *B60W 2710/0666* (2013.01); *B60W 2710/083* (2013.01)

(58) Field of Classification Search
CPC ...... F01N 9/00; F01N 2240/16; F02D 41/024; F02D 41/0255
See application file for complete search history.

(56) References Cited

U.S. PATENT DOCUMENTS

| | | | |
|---|---|---|---|
| 6,343,252 | B1 | 1/2002 | Asami et al. |
| 6,866,610 | B2 | 3/2005 | Ito |
| 7,007,464 | B1 | 3/2006 | Asami et al. |
| 7,591,130 | B2 | 9/2009 | Ito |
| 9,975,543 | B1* | 5/2018 | Norris ................... B60W 20/16 |
| 10,807,589 | B2 | 10/2020 | Thibault et al. |
| 11,624,304 | B2* | 4/2023 | Zhang ................... F01N 3/2013 |
| | | | 60/274 |
| 2002/0165063 | A1 | 11/2002 | Ito |
| 2009/0211233 | A1* | 8/2009 | Watanabe ............. F01N 3/2013 |
| | | | 60/277 |
| 2010/0212981 | A1* | 8/2010 | Roos ................... B60W 30/192 |
| | | | 903/930 |
| 2011/0047980 | A1* | 3/2011 | Santoso ................ B60W 10/08 |
| | | | 60/285 |
| 2011/0283675 | A1* | 11/2011 | Gonze ................... F02D 41/024 |
| | | | 60/274 |
| 2014/0000245 | A1* | 1/2014 | Harada ................. F01N 3/2026 |
| | | | 60/286 |
| 2014/0109556 | A1* | 4/2014 | Hashimoto ............... B60L 3/04 |
| | | | 60/299 |
| 2015/0057857 | A1* | 2/2015 | Katsuta ..................... B60L 7/26 |
| | | | 180/65.265 |
| 2015/0275792 | A1* | 10/2015 | Genslak ............. F02D 41/1446 |
| | | | 60/285 |
| 2015/0275795 | A1* | 10/2015 | Cygan, Jr. ............... F02D 41/04 |
| | | | 701/102 |
| 2019/0232948 | A1* | 8/2019 | Nawata .................. B60K 6/445 |
| 2019/0344777 | A1 | 11/2019 | Ourabah et al. |
| 2020/0232370 | A1* | 7/2020 | Hirooka ................. B60L 58/13 |
| 2020/0391721 | A1* | 12/2020 | Wang .................... B60W 10/08 |
| | | | 180/65.245 |

FOREIGN PATENT DOCUMENTS

| | | | | |
|---|---|---|---|---|
| DE | 10041535 A1 | 3/2001 | | |
| EP | 0570234 A1 | 11/1993 | | |
| EP | 0570240 A1 | 11/1993 | | |
| EP | 1247968 A2 | 10/2002 | | |
| FR | 3039116 A1 * | 1/2017 | ............... | B60K 6/48 |
| GB | 2493740 A * | 2/2013 | ............... | B60K 6/48 |
| JP | 2005146910 A * | 6/2005 | | |
| JP | 2010125906 A * | 6/2010 | | |

OTHER PUBLICATIONS

Zheng, Yuping et al., "Integrated energy and catalyst thermal management for plug-in hybrid electric vehicles", Energies 2018, 11, 1761; doi:10.3390/en11071761, Jul. 4, 2018, 29 pages (Year: 2018).*
Liu, Yuxing, "Distributed model predictive control with application to 48V diesel mild hybrid powertrains", Ph.D Dissertation, The Ohio State University, 2019, 175 pages (Year: 2019).*
English Translation of the Written Opinion for International Application No. PCT/EP2020/072335, dated Oct. 8, 2020, 8 pages.
International Search Report and Written Opinion for International Application No. PCT/EP2020/072335, dated Oct. 8, 2020, 8 pages.
International Search Report and Written Opinion for International Application No. PCT/EP2020/072335, dated Oct. 8, 2020, 12 pages (French).
Nüesch et al., "Equivalent Consumption Minimization Strategy for the Control of Real Driving $NO_x$ Emissions of a Diesel Hybrid Electric Vehicle", Energies, 2014, vol. 7, pp. 3148-3178.
Chinese Office Action for Chinese Application No. 202080062097.2, dated May 8, 2023 with translation, 14 pages.

* cited by examiner

[Fig. 1]

CONTROL COMPUTER FOR A DRIVE TRAIN OF A HYBRID VEHICLE

CROSS REFERENCE TO RELATED APPLICATIONS

This application is the U.S. National Phase application of PCT International Application No. PCT/EP2020/072335, filed Aug. 10, 2020, which claims priority to French Patent Application No. 1909784, filed Sep. 5, 2019, the contents of such applications being incorporated by reference herein.

FIELD OF THE INVENTION

The invention relates to the field of the control of the drivetrain of a hybrid vehicle, and notably to a method for controlling the drivetrain of a hybrid vehicle. It is a notable aspect of the invention to optimize the distribution of torque between a combustion engine and an electric machine of a vehicle and therefore the energy consumption of said vehicle.

BACKGROUND OF THE INVENTION

As is known, a hybrid vehicle comprises a drivetrain able to cause the wheels of the vehicle to turn and therefore cause the vehicle to move. In one known solution, such a drivetrain comprises a combustion engine, an electric machine, an electric battery and a catalytic converter.

The catalytic converter is a component of the exhaust system which is able to treat the exhaust gases burnt by the combustion engine in order to reduce their harmfulness before they are discharged into the atmosphere. Such pollutant gases notably include the oxides of nitrogen, such as, for example, nitrogen monoxide and nitrogen dioxide. In an existing solution, the catalytic converter comprises an electrical heating system able to increase its internal temperature in order to improve the cleaning of the exhaust gases.

In order to optimize control of the drivetrain and thus minimize the emissions of harmful exhaust gases, it is known practice to optimize, on the one hand, the distribution of torque between the combustion engine and the electric machine and, on the other hand, the energy consumption of the catalytic converter.

This is because it may be that some of the electrical energy supplied by the battery is consumed needlessly by the electrical system for heating the catalytic converter, and this can be a disadvantage.

In such cases, some of the fuel can be used by the combustion engine to recharge the battery and thus compensate for this loss of electrical energy, and once again, this can be a disadvantage.

There is therefore still a need for an optimized solution for controlling the drivetrain of a hybrid vehicle.

Document EP0570234A1, incorporated herein by reference, discloses a method of operation for a hybrid motor car having an electric motor for driving the vehicle and an internal combustion engine for producing energy. A plurality of target operating states for the engine are supplied, these being represented individually by functions of an actual vehicle speed and of a level of throttle-pedal depression, and guaranteeing lower fuel consumption. When one of the operating states which is compatible with the actual vehicle speed and level of throttle-pedal depression which are periodically detected is selected, then an engine throttle valve is slowly opened or closed to adjust it to a target level of throttle valve opening such that the selected operating state can be established. In this way, the hybrid motor car is able to enjoy increased range autonomy and improved power and exhaust gas characteristics.

SUMMARY OF THE INVENTION

The present application notably seeks to propose an improved computer and an improved method for controlling a drivetrain of a hybrid vehicle comprising at least one combustion engine, at least one electric machine, at least one battery and at least one "heated" catalytic converter comprising an internal heating system, to allow energy consumption to be minimized.

An aspect of the invention relates to a computer for controlling a drivetrain of a hybrid vehicle comprising at least one combustion engine, at least one electric machine, at least one battery and at least one "heated" catalytic converter comprising an internal heating system, said computer being configured to:

a. determine a plurality of values for a criterion pertaining to the energy consumption of the drivetrain, said consumption criterion being a function of:
  i. the distribution of torque between the at least one combustion engine and the at least one electric machine,
  ii. at least one combustion mode of the combustion engine, and
  iii. the energy consumption due to the use of the catalytic converter,
b. select the minimum value of the consumption criterion from among the plurality of determined values,
c. apply, over a predefined time interval, the combustion engine torque command, the electric machine torque command, the command pertaining to the energy consumption by the catalytic converter and the command pertaining to the combustion mode of the combustion engine corresponding to the selected minimum value of the consumption criterion, the computer being configured to determine the consumption criterion by executing the following formula:

$$C_{conso} = P_{fuel} + \alpha(SOC)P_{elec} + \beta\left(\frac{mNOx}{d}\right) * \left(\frac{\overline{mNOx}}{v} - NO_x^{lim}\right) + \overline{\alpha}(SOC) * P_{ehc} + \beta\left(\frac{mNOx}{d}\right) * \frac{dNO_x^{EHC}}{v}, \qquad \text{[Math. 1]}$$

where:

$P_{fuel}$ is the power derived from the consumption of fuel, as a function of the current engine speed, of the combustion engine torque and of the combustion mode of the combustion engine, $\alpha(SOC)$ is the equivalence factor connecting the consumption of electrical energy by the electric machine and the consumption of fuel by the combustion engine as a function of the state of charge of the battery, $P_{elec}$ is the operational electrical power of the electric machine, mNOx is the total mass of pollutants emitted since the start of the vehicle journey, or in other words, since the last time the vehicle started, d is the distance covered by the vehicle since the start of the journey, $$\beta\left(\frac{mNOx}{d}\right) \qquad \text{[Math. 2]}$$

is the harmful exhaust emissions penalty factor, $\overline{mNOx}$ is the flow rate of harmful exhaust gases or gases discharged into the atmosphere and is dependent on the combustion engine torque and on the combustion mode of the combustion engine, V is the speed of the vehicle, $NO_x^{lim}$ is the maximum limit for the emission of pollutants, $\overline{\alpha}$ (SOC) is the equivalence factor connecting the consumption of electrical energy by the internal heating system of the catalytic converter and the consumption of fuel by the combustion engine as a function of the state of charge of the battery, $P_{ehc}$ is the electrical power used by the internal heating system of the catalytic converter, $dNO_x^{EHC}$ is an estimate of the reduction of pollutant emissions after use of the catalytic converter.

The computer thus makes it possible to minimize the energy consumption, or in other words the consumption of fuel and of electrical energy, of a hybrid vehicle under the constraint of a maximum limit on the emissions of harmful exhaust gases.

The consumption criterion is thus determined by the computer by considering the distribution of torque between the at least one combustion engine and the at least one electric machine, the at least one combustion mode of the combustion engine and the energy consumption due to the use of the catalytic converter. The consumption criterion takes into account enough parameters to be representative of the behavior of a drivetrain of a hybrid vehicle and therefore to be a faithful indication of the energy consumption of this drivetrain.

As a further preference, the computer is configured to determine the plurality of values of a consumption criterion, to select the minimum value and to apply the combustion engine torque command, the electric machine torque command, the command pertaining to the energy consumption by the catalytic converter and the command pertaining to the combustion mode of the combustion engine corresponding to the minimum value, regularly, notably every 10 milliseconds to every 1 second.

Thus, the value of the consumption criterion is regularly updated and corresponds to the driving and/or to the driver of the vehicle.

An aspect of the invention also relates to a hybrid vehicle comprising at least one combustion engine, at least one electric machine, at least one battery and at least one "heated" catalytic converter comprising an internal heating system, and a computer as disclosed hereinabove.

The computer mounted in the hybrid vehicle thus makes it possible to minimize the consumption of energy, or in other words of fuel and of electrical energy, by the hybrid vehicle.

Advantageously, the catalytic converter internal heating system is electrical and is therefore powered by the battery.

The powering of the electrical heating by the battery is also taken into consideration in determining the consumption criterion.

An aspect of the invention also relates to a method for controlling a drivetrain of a hybrid vehicle comprising at least one combustion engine, at least one electric machine, at least one battery and at least one "heated" catalytic converter comprising an internal heating system, said method being implemented by a computer as disclosed hereinabove, and notable in that it comprises the steps of:

a. determining a plurality of values for a criterion pertaining to the energy consumption of the drivetrain, said consumption criterion being a function of:
  i. the distribution of torque between the at least one combustion engine and the at least one electric machine,
  ii. at least one combustion mode of the combustion engine, and
  iii. the energy consumption due to the use of the catalytic converter,
b. selecting the minimum value of the consumption criterion from among the plurality of determined values,
c. applying, over a predefined time interval, the combustion engine torque command, the electric machine torque command, the command pertaining to the energy consumption by the catalytic converter and the command pertaining to the combustion mode of the combustion engine corresponding to the selected minimum value of the consumption criterion, when executing the method, the consumption criterion being defined according to the following formula:

$$C_{conso} = P_{fuel} + \alpha(SOC)P_{elec} + \beta\left(\frac{mNOx}{d}\right) * \left(\frac{\overline{mNOx}}{v} - NO_x^{lim}\right) + \overline{\alpha}(SOC) * P_{ehc} + \beta\left(\frac{mNOx}{d}\right) * \frac{dNO_x^{EHC}}{v}. \quad \text{[Math. 5]}$$

The method thus makes it possible to minimize the energy consumption, or in other words the consumption of fuel and of electrical energy, of a vehicle under the constraint of a maximum limit on the emissions of harmful exhaust gases.

As a preference, the method is executed regularly, for example every 10 milliseconds to every 1 second.

BRIEF DESCRIPTION OF THE DRAWINGS

Other features and advantages of aspects of the invention will become more clearly apparent on reading the following description. This description is purely illustrative and must be read with reference to the attached drawings, in which.

DETAILED DESCRIPTION OF THE PREFERRED EMBODIMENTS

Figure 1:
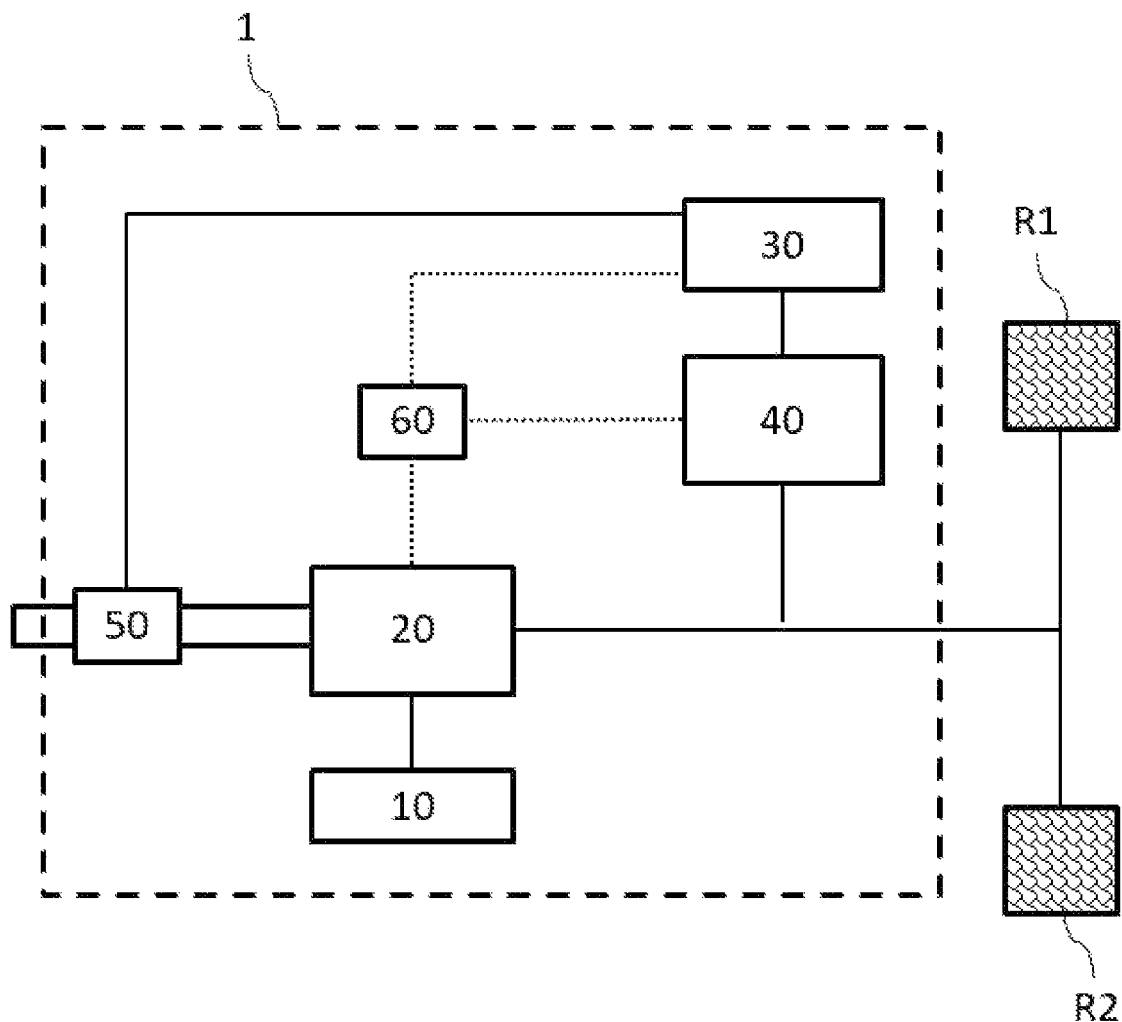
FIG. 1 illustrates one example of a drivetrain of a hybrid vehicle according to an aspect of the invention.

One embodiment of the hybrid vehicle according to the invention will be described with reference to FIG. 1. The vehicle comprises a drivetrain 1 able to cause the wheels R1, R2 of said vehicle to rotate.

In this example, the drivetrain 1 comprises a combustion engine 20, a fuel tank 10 connected to said combustion engine 20 so as to supply same with fuel, an electric machine 40, an electric battery 30 connected to the electric machine 40 in order to supply same with electrical energy, and an exhaust system comprising a catalytic converter 50. In this example, in order to simplify the description, a nonlimiting example of a drivetrain 1 comprising a single combustion engine 20 and a single electric machine 40 has been depicted, but it goes without saying that the hybrid vehicle could comprise more than one combustion engine 20, or even more than one electric machine 40.

The catalytic converter 50 is a component of the exhaust system which treats the exhaust gases from the combustion engine 20 in order to reduce the harmfulness thereof. Specifically, the exhaust gases emitted may prove to be particularly pollutant because they usually consist of oxides of nitrogen, and notably of nitrogen monoxide or nitrogen dioxide.

The catalytic converter 50 is said to be "heated" because it comprises an internal heating system, for example electrical, able to increase the internal temperature of the catalytic converter 50 in order to improve the performance thereof. The internal electrical heating system is powered by the electric battery 30 of the vehicle.

A combustion engine 20 of a hybrid vehicle comprises a plurality of combustion modes. For example, a diesel combustion engine 20 has three combustion modes.

Remember that a combustion cycle for a cylinder of a four-stroke engine comprises a gas intake phase, a compression phase, a combustion phase and an exhaust phase.

The first combustion mode allows the exhaust system to come up to temperature. Specifically, the first combustion mode is able to generate exhaust gases of higher temperature than the exhaust gases generated prior to implementation of the first mode. This additional heat thus allows the exhaust system pollution-control module to increase in temperature.

During the second mode, known as "high pressure EGR mode" where EGR stands for Exhaust Gas Recirculation, some of the burnt exhaust gases generated during the combustion phase are not removed via the exhaust system but directed back into at least one cylinder during the next intake phase.

The third mode, referred to as "double EGR mode", consists in a double exhaust gas recirculation. Specifically, the double EGR mode consists in using the high-pressure EGR mode described in the preceding paragraph, combined with recirculation of some of the exhaust gases to the air intake of the combustion engine 20. Note that this third combustion mode can be activated only when the combustion engine 20 is hot enough to prevent the water contained in the recirculated exhaust gases from condensing in the exhaust gas recirculation tubes. Said tubes notably connect the exhaust line and the intake line of the combustion engine 20. In addition, this third combustion mode is able to improve the efficiency of the combustion engine 20. In other words, the combustion engine 20 will consume less fuel.

It goes without saying that the combustion engine 20 could just as well be a gasoline engine and/or could comprise a different number of combustion modes than those set out in the preceding paragraphs.

In order to optimize the energy consumption of the drivetrain 1, or in other words in order to reduce the energy consumption of the vehicle, notably the fuel consumption, the vehicle comprises a computer 60 for controlling the drivetrain 1, notably able to control the level of charge of the battery 30, the electric machine 40 in terms of torque command and the combustion engine 20 in terms of fuel injection, by controlling actuators. Such actuators may, for example, be the injectors, the air intake valve, the EGR valve, which is defined as being a valve, of the combustion engine 20, that is operated in such a way as to allow or not allow recirculation of exhaust gases in the tubes, the inverter of the electric machine 40 or else the DC-DC converter of the catalytic converter 50 that is used to control the electrical power consumed by the catalytic converter 50.

To this end, the computer 60 comprises a processor capable of implementing a set of instructions making it possible to control said components of the drivetrain 1, notably said actuators, and to collect data pertaining to the components of the drivetrain 1 (for example from sensors), in a way known per se.

In order to optimize the control of the drivetrain 1, the computer 60 is able to control notably the distribution of torque between the combustion engine 20 and the electric machine 40, the combustion mode of the combustion engine 20 of the vehicle and the energy consumption due to use of the catalytic converter 50 and notably due to use of the internal heating system thereof.

To this end, the computer 60 is able to determine a plurality of values for a criterion $C_{conso}$ pertaining to the energy consumption of the drivetrain 1 as a function of the distribution of torque between the combustion engine 20 and the electric machine 40, of the at least one combustion mode CM of the combustion engine 20, and of the energy consumption $P_{ehc}$ due to use of the catalytic converter 50.

The computer 60 is also able to select the minimum value $C_{min}$ of the consumption criterion $C_{conso}$ from among the plurality of determined values, and to apply:

a combustion engine torque command $TQ_{eng\_cmd}$ corresponding to the selected minimum value $C_{min}$ of the consumption criterion $C_{conso}$, an electric machine torque command $TQ_{elec\_cmd}$ corresponding to the selected minimum value $C_{min}$ of the consumption criterion $C_{conso}$, a command $P_{ehc\_cmd}$ pertaining to the energy consumption of the catalytic converter 50 and corresponding to the selected minimum value $C_{min}$ of the consumption criterion $C_{conso}$, the consumption mode $CM_{cmd}$ of the combustion engine 20 corresponding to the selected minimum value $C_{min}$ of the consumption criterion $C_{conso}$, as described hereinafter.

Method

A preferred embodiment of the method for controlling a drivetrain 1 of a hybrid vehicle as disclosed hereinabove will now be described with reference to FIG. 2.

Determination Step E1

First of all, the method comprises a step E1 of determining a plurality of values for a criterion $C_{conso}$ pertaining to the energy consumption of the drivetrain 1.

Figure 2:
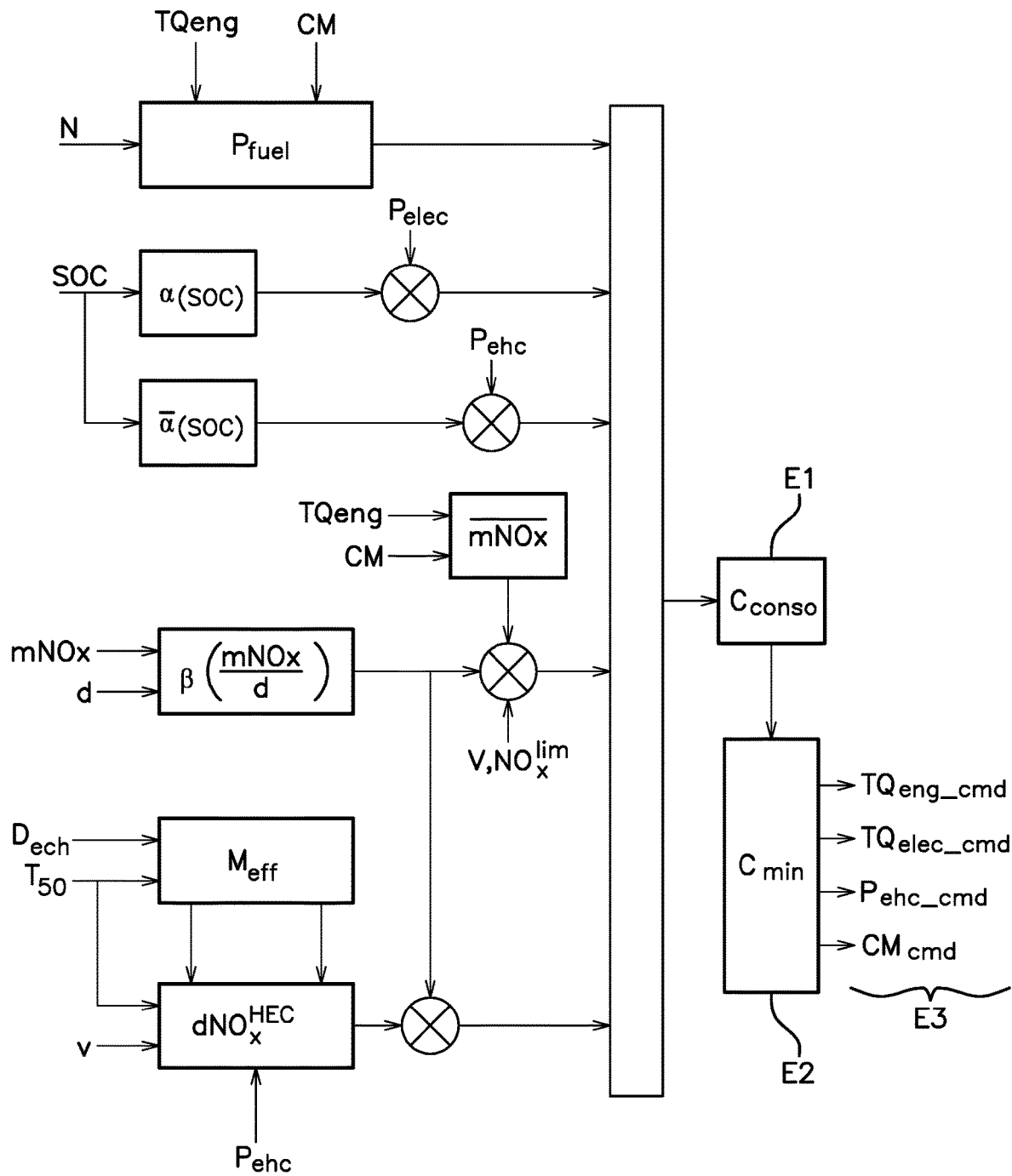
FIG. 2 illustrates one example of the method for controlling a drivetrain of a hybrid vehicle according to an aspect of the invention.

More specifically, with reference to FIG. 2, the consumption criterion $C_{conso}$ is defined according to the following formula:

$$C_{conso} = P_{fuel} + \alpha(SOC)P_{elec} + \beta\left(\frac{\overline{mNOx}}{d}\right) * \left(\frac{\overline{mNOx}}{v} - NO_x^{lim}\right) + \quad \text{[Math. 6]}$$

$$\overline{\alpha}(SOC) * P_{ehc} + \beta\left(\frac{mNOx}{d}\right) * \frac{dNO_x^{EHC}}{v}$$

The group

[Math. 7]

$(P_{fuel} + \alpha(SOC)P_{elec})$ represents the equivalent fuel consumption, where:

$P_{fuel}$ is the power derived from the consumption of fuel, as a function of the current engine speed N, of the combustion engine torque TQeng and of the combustion mode CM of the combustion engine 20, $P_{elec}$ is the operational electrical power of the electric machine 40, $\alpha(SOC)$ is the equivalence factor connecting the consumption of electrical energy by the electric machine 40 and the consumption of fuel by the combustion engine 20 as a function of the state of charge SOC of the battery 30, and so said equivalence factor α(SOC) notably allows the use of electrical power $P_{elec}$ by the electric machine 40 to be converted into a variation in fuel consumption that will then be needed in order to recharge the battery 30, the battery 30 having been partially discharged in order to power the electric machine 40. In particular, when the electric machine 40 is operating as a generator and producing electrical energy, said equivalence factor α(SOC) allows the generation of electrical power $P_{elec}$ by the electric machine 40 to be converted into a future reduction in fuel consumption. Specifically, by generating electrical power $P_{elec}$, the electric machine 40 recharges the battery 30. This energy stored in the battery 30 will then be converted back by the electric machine 40 into mechanical energy and therefore allow the combustion engine 20 to supply less torque and therefore consume less fuel.

The group $$\left(\beta\left(\frac{mNOx}{d}\right) * \left(\frac{\overline{mNOx}}{v} - NO_x^{lim}\right)\right) \quad \text{[Math. 8]}$$

represents the impact that emissions of harmful exhaust gases have on the consumption criterion $C_{conso}$, where:

$$\beta\left(\frac{mNOx}{d}\right) \quad \text{[Math. 9]}$$

is the harmful emissions penalty factor,
mNOx is the total mass of pollutants emitted since the start of the vehicle journey, or in other words, since the last time the vehicle started,
d is the distance covered by the vehicle since the start of the journey,
V is the speed of the vehicle,

[Math. 10]

$\overline{mNOx}$ is the flow rate of harmful exhaust gases or gases discharged into the atmosphere and is dependent on the combustion engine torque TQeng and on the combustion mode CM of the combustion engine 20,
$NO_x^{lim}$ is the maximum limit for the emission of pollutants, defined by the vehicle manufacturer.

Finally, the group $$\left(\overline{\alpha}(SOC) * P_{ehc} + \beta\left(\frac{mNOx}{d}\right) * \frac{dNO_x^{EHC}}{v}\right) \quad \text{[Math. 11]}$$

represents the impact of the use of the catalytic converter 50 on the energy consumption and the emissions of pollutant gases.

The group

[Math. 12]

$\overline{\alpha}(SOC) * P_{ehc}$ represents the estimate of the equivalent fuel consumption that will allow the battery 30 to be recharged after electrical energy from the battery 30 has been used by the internal heating system, where:
$P_{ehc}$ is the electrical power used by the internal heating system of the catalytic converter 50,

[Math. 13]

$\overline{\alpha}(SOC)$ is the equivalence factor connecting the consumption of electrical energy by the internal heating system of the catalytic converter 50 and the consumption of fuel by the combustion engine 20 as a function of the state of charge SOC of the battery 30, and so said equivalence factor

[Math. 14]

$\overline{\alpha}(SOC)$ notably makes it possible to convert the use of electrical power $P_{ehc}$ for the internal heating system heating the catalytic converter 50, into a variation in fuel consumption that will then be needed in order to recharge the battery 30, the battery 30 having been partially discharged in order to power the heating system.

In addition, the group $$\beta\left(\frac{mNOx}{d}\right) * \frac{dNO_x^{EHC}}{v} \quad \text{[Math. 15]}$$

represents an estimate of the reduction in harmful emissions after use for the catalytic heating, where:

$$\beta\left(\frac{mNOx}{d}\right) \quad \text{[Math. 16]}$$

is the harmful emissions penalty factor,
$dNO_x^{EHC}$ is an estimate of the reduction of pollutant emissions after use of the catalytic converter 50, determined from the vehicle speed V, from the electrical power $P_{ehc}$ used by the internal heating system of the catalytic converter 50 and from a model $M_{eff}$ of the efficacy of the treatment of the exhaust gases, said model being determined from the exhaust airflow rate $D_{ech}$ and from the temperature Tso of the catalytic converter 50.

The efficacy model $M_{eff}$ is a function that calculates an estimate of the efficacy of the treatment of the exhaust gases by the catalytic converter 50. For example, the efficacy model $M_{eff}$ comprises a table of data containing the exhaust gas treatment efficacy for various values of exhaust temperature $T_{50}$ and various exhaust air flow rates $D_{ech}$.

Thus, the consumption criterion $C_{conso}$ is a function of the following three parameters:
the distribution of torque between the combustion engine 20 and the at least one electric machine 40,
the combustion mode CM of the combustion engine 20, and
the energy consumption due to the use of the catalytic converter 50.

The plurality of values for the consumption criterion $C_{conso}$ is determined by varying the values of the distribution of torque between the torque of the combustion engine 20 and the torque of the electric machine 40, of the consumption of electrical energy due to use of the catalytic converter 50 and by varying the type of combustion mode CM of the combustion engine 20.

The dataset of values for the torque of the electric machine 40 may for example comprise fifty values sampled regularly or irregularly between −50 to 50 Nm. The torque of the combustion engine 20 will adapt itself so that the sum of the torque from the combustion engine 20 and of the torque from the electric machine 40 is equal to the torque required by the driver. The dataset of values for the consumption of energy used by the catalytic converter 50 comprises, for example, sixteen power values sampled at increments of 250 kW, between 0 and 4 kW. The combustion engine 20 comprises a plurality of combustion modes as described hereinabove and, according to the example described here, the combustion engine 20 comprises three combustion modes.

Thus, according to this example, the set of possible combinations of torque distribution value, combustion mode CM of the combustion engine 20, and value of energy consumption due to use of the catalytic converter 50 comprises 50*16*3=2400 values.

Selection Step E2

The method next comprises a step E2 of selecting the minimum value $C_{min}$ of the consumption criterion $C_{conso}$ from among the plurality of determined consumption criterion $C_{conso}$ values, the minimum value $C_{min}$ representing the lowest value for the consumption of energy, electrical and in terms of fuel, that was determined in the preceding step.

Application Step E3

Finally, in an application step E3, the computer 60 applies, over a predefined time interval:

to the combustion engine 20, a torque command referred to as "combustion engine" torque command $TQ_{eng\_cmd}$ corresponding to the value of combustion engine torque TQeng used for determining the selected minimum value $C_{min}$ of the consumption criterion $C_{conso}$, to the electric machine 40, an electric machine torque command $TQ_{elec\_cmd}$ corresponding to the value of electric machine torque TQelec used for determining the selected minimum value $C_{min}$ of the consumption criterion $C_{conso}$, to the catalytic converter 50, an energy consumption command $P_{ehc\_cmd}$ corresponding to the value of energy consumption $P_{ehc}$ used for determining the selected minimum value $C_{min}$ of the consumption criterion $C_{conso}$, and to the combustion engine 20, a combustion mode $CM_{cmd}$ corresponding to the combustion mode CM used for determining the selected minimum value $C_{min}$ of the consumption criterion $C_{conso}$.

The application step E3 is, for example, defined over a predefined time interval of 10 milliseconds.

Once the application step E3 is finished, the minimum value $C_{min}$ is not saved, in other words it is erased.

In addition, the performing of the three steps of the method is reiterated regularly, for example every 10 milliseconds to every second.

The invention claimed is:

1. A computer for controlling a drivetrain of a hybrid vehicle comprising at least one combustion engine, at least one electric machine, at least one battery and at least one "heated" catalytic converter comprising an internal heating system, said computer being configured to:

a) determine a plurality of values for a criterion ($C_{conso}$) pertaining to an energy consumption of the drivetrain, said consumption criterion ($C_{conso}$) being a function of:

i) a distribution of torque between the at least one combustion engine and the at least one electric machine, ii) at least one combustion mode of the combustion engine, and iii) an energy consumption by the catalytic converter, b) select a minimum value ($C_{min}$) of the consumption criterion ($C_{conso}$) from among the plurality of determined values, c) apply, over a predefined time interval, a combustion engine torque command ($TQ_{eng\_cmd}$) to the at least one combustion engine, an electric machine torque command ($TQ_{elec\_cmd}$) to the at least one electric machine, a command ($P_{ehc\_cmd}$) pertaining to the energy consumption by the catalytic converter to the at least one "heated" catalytic converter and a command ($CM_{cmd}$) pertaining to the combustion mode of the combustion engine to the at least one combustion engine, the commands corresponding to the selected minimum value ($C_{min}$) of the consumption criterion ($C_{conso}$), the consumption criterion ($C_{conso}$) being determined by executing the following formula:

$$C_{conso} = P_{fuel} + \alpha(SOC)P_{elec} + \beta(mNOx/d)*(\overline{mNOx}/v - NO_x^{lim}) + \overline{\alpha}(SOC)*P_{ehc} + \beta(mNOx/d)*dNO_x^{EHC}/v,$$

where $P_{fuel}$ is the power derived from the consumption of fuel, as a function of a current engine speed, of a combustion engine torque and of the combustion mode of the combustion engine, $\alpha(SOC)$ is an equivalence factor connecting the consumption of electrical energy by the electric machine and the consumption of fuel by the combustion engine as a function of a state of charge (SOC) of the battery, $P_{elec}$ is an operational electrical power of the electric machine, mNOx is the total mass of pollutants emitted since a start of a vehicle journey, or in other words, since the last time the vehicle started, d is the distance covered by the vehicle since the start of the vehicle journey, $\beta(mNOx/d)$ is a harmful exhaust emissions penalty factor, $\overline{mNOx}$ is a flow rate of harmful exhaust gases discharged into the atmosphere and is dependent on the combustion engine torque (TQeng) and on the combustion mode of the combustion engine, v is the speed of the vehicle, $NO_x^{lim}$ is the maximum limit for the emission of pollutants, and $\overline{\alpha}$ (SOC) is an equivalence factor connecting the consumption of electrical energy by the internal heating system of the catalytic converter and the consumption of fuel by the combustion Pent is engine as a function of the state of charge (SOC) of the battery, $P_{ehc}$ the electrical power used by the internal heating system of the catalytic converter, $dNO_x^{EHC}$ is an estimate of the reduction of pollutant emissions after use of the catalytic converter.

2. The computer as claimed in claim 1, configured to determine the plurality of values of a consumption criterion ($C_{conso}$), to select the minimum value ($C_{min}$) and to apply the combustion engine torque command ($TQ_{eng\_cmd}$), the electric machine torque command ($TQ_{elec\_cmd}$), the command ($P_{ehc\_cmd}$) pertaining to the energy consumption by the catalytic converter and the command ($CM_{cmd}$) pertaining to the combustion mode of the combustion engine corresponding to the minimum value ($C_{min}$), regularly, every 10 milliseconds to every 1 second.

3. A method for controlling a drivetrain of a hybrid vehicle comprising at least one combustion engine, at least one electric machine, at least one battery and at least one "heated" catalytic converter comprising an internal heating system, said method being implemented by a computer as claimed in claim 1, the method comprising:

a) determining a plurality of values for a criterion ($C_{conso}$) pertaining to the energy consumption of the drivetrain, said consumption criterion ($C_{conso}$) being a function of:
  i) the distribution of torque between the at least one combustion engine and the at least one electric machine,
  ii) at least one combustion mode of the combustion engine, and
  iii) the energy consumption due to the use of the catalytic converter, b) selecting the minimum value ($C_{min}$) of the consumption criterion ($C_{conso}$) from among the plurality of determined values, c) applying, over a predefined time interval, the combustion engine torque command ($TQ_{eng\_cmd}$), the electric machine torque command ($TQ_{elec\_cmd}$), the command ($P_{ehc\_cmd}$) pertaining to the energy consumption by the catalytic converter and the command ($CM_{cmd}$) pertaining to the combustion mode of the combustion engine corresponding to the selected minimum value ($C_{min}$) of the consumption criterion ($C_{conso}$), wherein the consumption criterion ($C_{conso}$) is defined according to the following formula:

$$C_{conso}=P_{fuel}+\alpha(SOC)P_{elec}+\beta(mNOx/d)*(\overline{mNOx}/v - NO_x^{lim})+\overline{\alpha}(SOC)*P_{ehc}+\beta(mNOx/d)*dNO_x^{EHC}/v,$$

where $P_{fuel}$ is the power derived from the consumption of fuel, as a function of the current engine speed, of the combustion engine torque (TQeng) and of the combustion mode of the combustion engine, $\alpha(SOC)$ is an equivalence factor connecting the consumption of electrical energy by the electric machine and the consumption of fuel by the combustion engine as a function of the state of charge (SOC) of the battery, $P_{elec}$ is the operational electrical power of the electric machine, mNOx is the total mass of pollutants emitted since the start of the vehicle journey, or in other words, since the last time the vehicle started, d is the distance covered by the vehicle since the start of the vehicle journey, $\beta(mNOx/d)$ is the harmful exhaust emissions penalty factor, $\overline{mNOx}$ is the flow rate of harmful exhaust gases discharged into the atmosphere and is dependent on the combustion engine torque ($TQ_{eng}$) and on the combustion mode of the combustion engine, v is the speed of the vehicle, $NO_x^{lim}$ is the maximum limit for the emission of pollutants, and $\overline{\alpha}$ (SOC) is an equivalence factor connecting the consumption of electrical energy by the internal heating system of the catalytic converter and the consumption of fuel by the combustion engine as a function of the state of charge (SOC) of the battery, $P_{ehc}$ is the electrical power used by the internal heating system of the catalytic converter, $dNO_x^{EHC}$ is an estimate of the reduction of pollutant emissions after use of the catalytic converter.

4. The method as claimed in claim 3 executed regularly, every 10 milliseconds to every 1 second.

5. The method as claimed in claim 4, wherein the step of applying the combustion engine torque command ($TQ_{eng\_cmd}$), the electric machine torque command ($TQ_{elec\_cmd}$), the command ($P_{ehc\_cmd}$) pertaining to the energy consumption by the catalytic converter and the command ($CM_{cmd}$) pertaining to the combustion mode of the combustion engine is defined over a predefined time interval of between 10 milliseconds and 1 second.

6. The method as claimed in claim 4, wherein the step of applying the combustion engine torque command ($TQ_{eng\_cmd}$), the electric machine torque command ($TQ_{elec\_cmd}$), the command ($P_{ehc\_cmd}$) pertaining to the energy consumption by the catalytic converter and the command ($CM_{cmd}$) pertaining to the combustion mode of the combustion engine is defined over a predefined time interval of 10 milliseconds.

7. The method as claimed in claim 3, wherein the step of applying the combustion engine torque command ($TQ_{eng\_cmd}$), the electric machine torque command ($TQ_{elec\_cmd}$), the command ($TQ_{eng\_cmd}$) pertaining to the energy consumption by the catalytic converter and the command ($CM_{cmd}$) pertaining to the combustion mode of the combustion engine is defined over a predefined time interval of between 10 milliseconds and 1 second.

8. The method as claimed in claim 3, wherein the step of applying the combustion engine torque command ($TQ_{eng\_cmd}$), the electric machine torque command ($TQ_{elec\_cmd}$), the command ($P_{ehc\_cmd}$) pertaining to the energy consumption by the catalytic converter and the command ($CM_{cmd}$) pertaining to the combustion mode of the combustion engine is defined over a predefined time interval of 10 milliseconds.

9. A hybrid vehicle comprising:
at least one internal combustion engine,
at least one electric machine,
at least one battery,
at least one "heated" catalytic converter comprising an internal heating system, and
a computer for controlling a drivetrain of the hybrid vehicle, said computer being configured to:

a) determine a plurality of values for a criterion ($C_{conso}$) pertaining to an energy consumption of the drivetrain, said consumption criterion ($C_{conso}$) being a function of:
  i) a distribution of torque between the at least one combustion engine and the at least one electric machine,
  ii) at least one combustion mode of the combustion engine, and
  iii) an energy consumption by the catalytic converter, b) select a minimum value ($C_{min}$) of the consumption criterion ($C_{conso}$) from among the plurality of determined values, c) apply, over a predefined time interval, a combustion engine torque command ($TQ_{eng\_cmd}$) to the at least one combustion engine, an electric machine torque command ($TQ_{elec\_cmd}$) to the at least one electric machine, a command ($P_{ehc\_cmd}$) pertaining to the energy consumption by the catalytic converter to the at least one "heated" catalytic converter and a command ($CM_{cmd}$) pertaining to the combustion mode of the combustion engine to the at least one combustion engine, the commands corresponding to the selected minimum value ($C_{min}$) of the consumption criterion ($C_{conso}$), the consumption criterion ($C_{conso}$) being determined by executing the following formula:

$$C_{conso}=P_{fuel}+\alpha(SOC)P_{elec}+\beta(mNOx/d)*(\overline{mNOx}/v - NO_x^{lim})+\overline{\alpha}(SOC)*P_{ehc}+\beta(mNOx/d)*dNO_x^{EHC}/v,$$

where $P_{fuel}$ is the power derived from the consumption of fuel, as a function of a current engine speed, of a combustion engine torque and of the combustion mode of the combustion engine, $\alpha(SOC)$ is an equivalence factor connecting the consumption of electrical energy by the electric machine and the consumption of fuel by the combustion engine as a function of a state of charge (SOC) of the battery, $P_{elec}$ is an operational electrical power of the electric machine, mNOx is the total mass of pollutants emitted since a start of a vehicle journey, or in other words, since the last time the vehicle started, d is the distance covered by the vehicle since the start of the vehicle journey, β(mNOx/d) is a harmful exhaust emissions penalty factor, $\overline{mNOx}$ is a flow rate of harmful exhaust gases discharged into the atmosphere and is dependent on the combustion engine torque ($TQ_{eng}$) and on the combustion mode of the combustion engine, v is the speed of the vehicle, $NO_x^{lim}$ is the maximum limit for the emission of pollutants, and $\overline{\alpha}$ (SOC) is an equivalence factor connecting the consumption of electrical energy by the internal heating system of the catalytic converter and the consumption of fuel by the combustion engine as a function of a state of charge (SOC) of the battery, $P_{ehc}$ the electrical power used by the internal heating system of the catalytic converter, $dNO_x^{EHC}$ is an estimate of the reduction of pollutant emissions after use of the catalytic converter.

10. The vehicle as claimed in claim 9, wherein the internal heating system of the catalytic converter is electrical.

* * * * *